United States Patent
Chu et al.

(10) Patent No.: US 6,750,309 B1
(45) Date of Patent: Jun. 15, 2004

(54) METHACRYLATED POLYURETHANE COPOLYMERS WITH SILICONE SEGMENTS CONTAINING ALKOXYSILYL GROUPS

(75) Inventors: Hsien-Kun Chu, Wethersfield, CT (US); Steven T. Nakos, Andover, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 10/150,628

(22) Filed: May 17, 2002

(51) Int. Cl.$^7$ .................. C08G 77/458; C08G 77/26
(52) U.S. Cl. .................. 528/28; 528/17; 528/25; 528/38; 525/474; 522/91; 522/148; 522/172
(58) Field of Search .................. 528/17, 25, 28, 528/38; 525/474; 522/91, 148, 172

(56) References Cited

U.S. PATENT DOCUMENTS

| | | |
|---|---|---|
| 4,042,613 A | 8/1977 | Takamizawa et al. |
| 4,293,397 A | 10/1981 | Sato et al. .................... 522/99 |
| 4,369,300 A | 1/1983 | Carter et al. |
| 4,563,539 A | 1/1986 | Gornowicz et al. ......... 556/421 |
| 4,631,329 A | 12/1986 | Gornowicz et al. |
| 4,684,538 A | 8/1987 | Klemarczyk |
| 4,839,443 A | 6/1989 | Akutsu et al. |
| 4,857,623 A | 8/1989 | Emmerling et al. |
| 4,916,199 A | 4/1990 | Bandlish et al. |
| 4,999,412 A | 3/1991 | Neale et al. |
| 5,091,483 A | 2/1992 | Mazurek et al. ............. 525/477 |
| 5,120,812 A | 6/1992 | O'Lenick, Jr. et al. |
| 5,237,082 A | 8/1993 | Leir et al. .................... 556/413 |
| 5,300,608 A | 4/1994 | Chu et al. |
| 5,326,845 A | 7/1994 | Linden |
| 5,378,734 A | 1/1995 | Inoue .......................... 522/11 |
| 5,489,622 A | 2/1996 | Hara et al. .................... 522/99 |
| 5,760,155 A | 6/1998 | Mowrer et al. |
| 5,908,949 A | 6/1999 | O'Lenick, Jr. |
| 5,986,018 A | 11/1999 | Yamaguchi et al. ......... 525/455 |
| 6,407,195 B2 | 6/2002 | Sherman et al. ............. 528/28 |
| 2002/0028901 A1 | 3/2002 | Gunatillake et al. .......... 528/28 |

FOREIGN PATENT DOCUMENTS

GB 1384898 2/1975

*Primary Examiner*—Jeffrey B. Robertson
(74) *Attorney, Agent, or Firm*—Steven C. Bauman

(57) ABSTRACT

The present invention relates to the preparation of a new class of materials, namely, an acrylate terminated or end-capped urethane/urea copolymer containing silicone soft segments capable of dual cure via unsaturated groups and dialkoxyl silanol groups. This new class of material is a reaction product of a partially methacrylated end-capped urethane polymer containing hard segment blocks and an amino alkylene dialkoxy end-capped siloxane block polymer, containing soft-segments. The aminoalkylene dialkoxysilane end-capped siloxane segment of this copolymer can include siloxane diol segments of various molecular weights (e.g., 1,000 to 20,000) end-capped with various alkylaminoalkylene trimethoxy silanes. This copolymer is therefore capable of dual cure via these functional groups.

30 Claims, No Drawings

METHACRYLATED POLYURETHANE COPOLYMERS WITH SILICONE SEGMENTS CONTAINING ALKOXYSILYL GROUPS

BACKGROUND OF THE INVENTION

1. Field of the Invention

The present invention relates to the preparation of a new class of polymers, namely methacrylated urethane/urea copolymers containing moisture curable silicone soft segments in the polymer backbone, and compositions prepared therefrom. More specifically, this invention relates to the preparation of a copolymer derived from a partially methacrylated urethane prepolymer and an amino alkylene dialkoxysilanol terminated silicone prepolymer. These materials therefore have olefinic functionality and alkoxysilane functionality, allowing for cure by means of free radical (photo or anaerobic) mechanisms, as well as by moisture cure.

2. Description of Related Technology

It is known that diisocyanate end-capped urethane, containing both hard block and soft block segments can be prepared by proper control of the stoichiometry and steps in the process. For example, a diisocyanate end-capped hard block segment can be prepared from a diisocyanate and a rigid diol as a first stage or step, followed by a reaction of this diisocyanate end-capped prepolymer with a long chain diol to yield a diisocyanate end-capped polyurethane with soft and hard segments.

U.S. Pat. No. 4,684,538 to Klemarczyk discloses a method to produce acrylate end-capped polysiloxane urethane compositions in which siloxane-carbinol bonds are in the repeat unit of the polymer chain and which are capable of fast UV cure.

U.S. Pat. No. 5,760,155 to Mowrer describes a novel polysiloxane urethane composition in which one of the repeat units in the polymer back bone is comprised of urethane Si bonds, i.e.

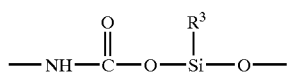

The disadvantage of this kind of repeat unit is the inherent hydrolytic instability.

The interest in polysiloxane/polyurethane compositions is further exemplified by U.S. Pat. No. 4,839,443 to Akutus et al., whereby improved surfaces characteristics are alleged. Linear silicone-urethane copolymers are described as providing films of high strength and elasticity when cast from aqueous dispersions.

There is a definite need for a new process which provides polyurethane siloxane copolymers having excellent toughness and adhesive properties. It would be even more advantageous to produce an acrylated end-capped urethane-urea siloxane copolymers without the limitations of prior compositions.

SUMMARY OF THE INVENTION

One aspect of the present invention relates to a new class of (meth)acrylated urethane/urea copolymer compositions having moisture curable silicone segments and photocurable acrylated end-caps. The compositions are particularly useful in a variety of applications such as in the adhesive, coating, caulking and potting areas. These compositions have found to be particularly useful in the electronic, automotive, industrial and consumer fields.

In the synthesis of acrylate end-capped polysiloxane/ urethane urea copolymers of the present invention, a process in forming polysiloxane/urethane-urea units was developed to minimize the concentration of available isocynate groups which cause biuret formation. This process, whereby the acrylated polyurethane prepolymer is formed first, and the polysiloxane units are incorporated in a second step, allows for the formation of a dual cured end-capped aminoalkylene dialkoxy silicone/polyurethane material having minimum biuret formation. Moreover, since the polymer is acrylated in the first step of the process it is free of hydroxyalkyl (meth)acrylate, thereby alleviating environmental issues relating to by-products.

In one aspect of the invention there is provided a curable polymer having the structure I:

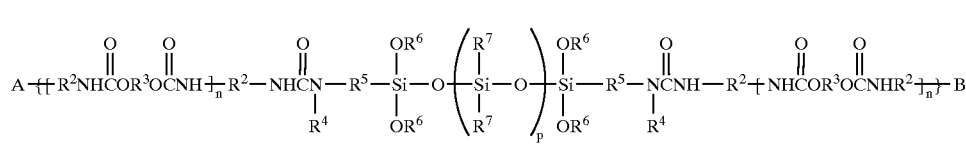

wherein A and B may be the same or different and have the structure:

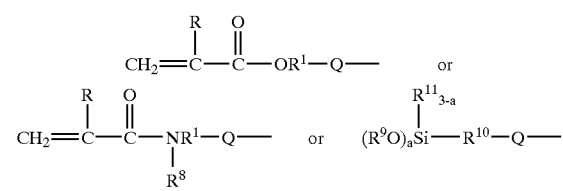

(i) wherein Q is

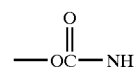

or

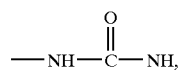

a is 2 to 3; $R^1$ and $R^{10}$ may be the same or different and may be a substituted or unsubstituted $C_1$–$C_{10}$ alkylene group; R is H or $CH_3$; and (ii) wherein $R^4$, $R^6$, $R^7$, $R^8$, $R^9$ and $R^{11}$ may be the same or different and are substituted or unsubstituted hydrocarbon radicals; $R^{11}$ may also be saturated or unsaturated, for example, it may contain a vinyl group or a (meth)acrylate group; $R^2$, $R^3$ and $R^5$ may be the same or different and are divalent substituted $C_1$–$C_{40}$ aliphatic, cycloaliphatic or aromatic hydrocarbon radicals, or a polyol, polyester, or polyalkylidene having a weight average molecular weight from about 200 to about 5,000; n is an integer from 1–1000, desirably 1–10 and more desirably 1–5; p is an integer from 1–1200, desirably 1–200 and more desirably 1–100.

In a further aspect of the invention there is provided a curable polymer which includes the reaction product of:
a) a reactive prepolymer component having a radiation-curable group proximal to one terminus of the prepolymer and an isocyanate group proximal to the other terminus of the prepolymer; and
b) an aminoalkylenedialkoxysilyl-terminated polydiorganosiloxane.

In a still further aspect of the invention there is provided a dual curing composition which includes
a) a (meth)acrylated urethane/urea silicone copolymer which includes the structure:

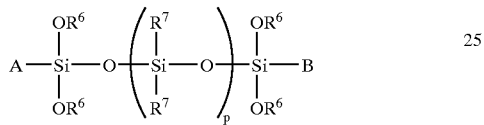

wherein A and B may be the same or different and have the structure:

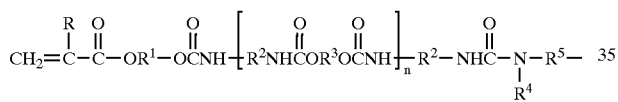

wherein R is H or $CH_3$; $R^1$ is a divalent substituted or unsubstituted $C_1$–$C_{40}$ aliphatic, cycloaliphatic or aromatic hydrocarbon radical; $R^2$=$R^1$ and may be the same or different; $R^3$ is a polyol, polyether, polyalkylidiene, or polyester having a weight average molecular weight from about 200 to about 5,000; n is an integer from 1–1000; p is an integer from 1–1,200; $R^4$ is a monovalent substituted or unsubstituted aliphatic, cycloaliphatic or aromatic hydrocarbon radical $C_1$–$C_{40}$; $R^5$ is a substituted or unsubstituted divalent $C_1$–$C_{40}$ aliphatic, cycloaliphatic or aromatic hydrocarbon radical; $R^6$=$R^4$ and may be the same or different; $R^7$=$R^6$ and may be the same or different; and
b) a cure system for said copolymer.

In still a further aspect of the invention there is provided a method of preparing a curable (meth)acrylated polyurethane/urea silicone co-polymer which includes the step of:
reacting an isocyanate prepolymer having a terminal (meth)acrylate group with an noalkylenedialkoxysilyl-terminated polydiorganosiloxane.

DETAILED DESCRIPTION OF THE INVENTION

In discovering the present invention, it has also been determined that the formation of biuret groups within the backbone structure is also less desirable because it leads to a more rigid structure due to increased crosslinking within the polymer system. The biuret crosslinking reaction occurs when an isocyanate group reacts with intermediate urea groups as shown in the reaction below. The formation of a biuret is schematically shown below:

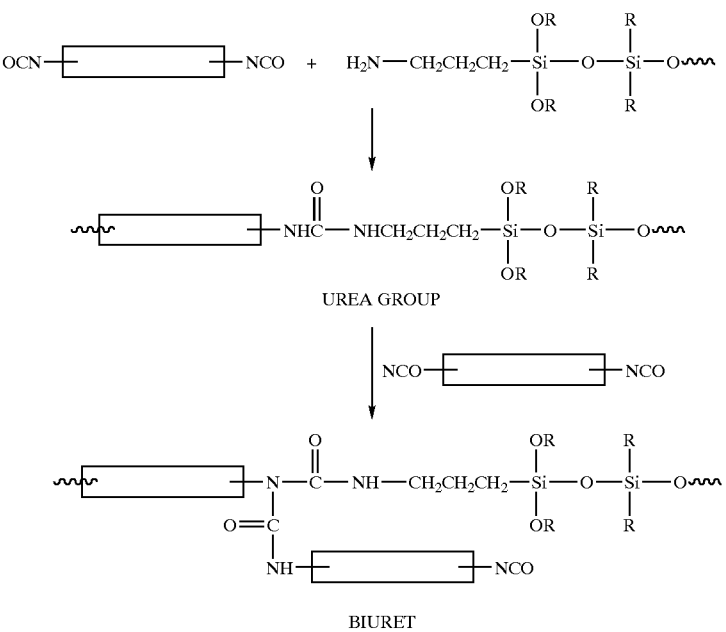

In contrast to conventional processes for forming polyurethane/acrylates which contain urethane linkages joining the hard and soft segments, the present invention uses a urea linkage to form these segments. This linkage is formed by the reaction of an isocyanate prepolymer with an aminoalkylene dialkoxy-terminated polydimethylsiloxane. The use of secondary amines as opposed to primary amines in this reaction is desirable because it minimizes the formation of biuret by-product. This is because the urea functionality unit formed in the isocyanate/amine reaction is capable of further reaction with available isocyanate group to form a crosslinked biuret structure. This increases the viscosity of the copolymer and limits the processability of the copolymer for further applications such as for adhesives, coatings and sealants. Thus, the present invention provides a process and composition which avoids the formation of biruets.

More particularly, the (meth)acrylated urethane/urea alkylaminoalkenedialkoxy siloxanes of the present invention include those represented by structure I:

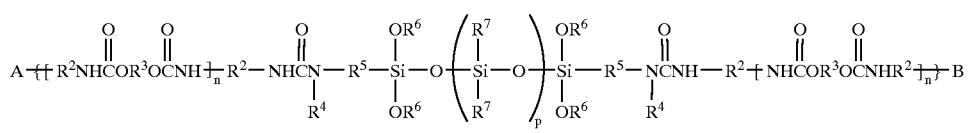

wherein A and B may be the same or different and have the structure:

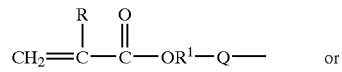

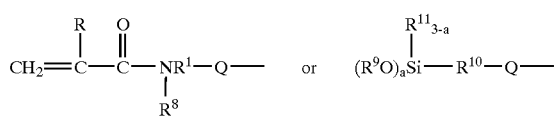 or 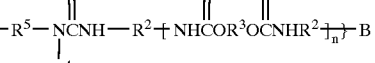

a is 2–3; $R^1$ and $R^{10}$ may be the same or different and may be a substituted or unsubstituted $C_1$–$C_{10}$ alkylene group; R is H or $CH_3$; $R^4$, $R^6$, $R^7$, $R^8$, $R^9$ and $R^{11}$ may be the same or different and are substituted or unsubstituted hydrocarbon radicals; $R^{11}$ may also be saturated or unsaturated, for example, it may be a vinyl or (meth)acrylate group; $R^2$, $R^3$ and $R^5$ may be the same or different and are divalent substituted $C_1$–$C_{40}$ aliphatic, cycloaliphatic or aromatic hydrocarbon radicals, or a polyol, polyester, or polyalkylidene having a weight average molecular weight from about 200 to about 5,000; n is an integer from 1–1,000, desirably 1–10 and more desirably 1–5; p is an integer from 1–1200, desirably 1–200 and more desirable 1–100.

Particularly desirable embodiments have the aforementioned structure I include those where A and B are identical and, for example, have the methacryloxy structure

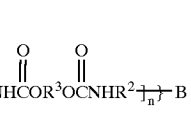

wherein R is methyl, $R^1$ is ethylene, and Q is

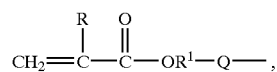

as shown in structure II:

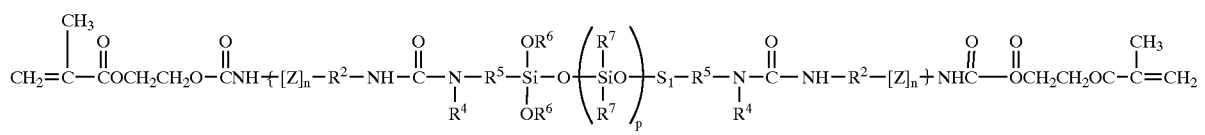

wherein Q is

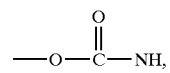

or

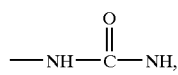

Another desirable aspect of the invention includes compounds where A and B have the methacrylamide structure

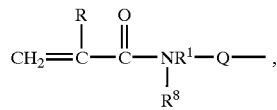

wherein R and $R^1$ are defined as above, $R^8$ is methyl, and Q is

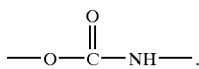

Such a case corresponds to structure III:

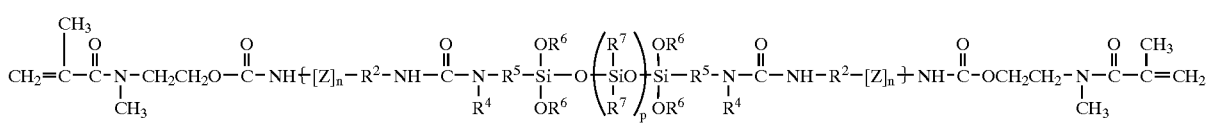

III

In still a further desirable embodiment, substituents A and B may be a substituted alkoxy silyl radical

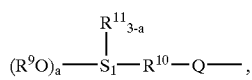

where a=2, $R^9$ is methyl, $R^{11}$ is methacryloxypropyl, $R^{10}$ is propylene and Q is

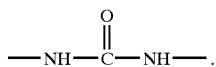

Such a case corresponds to structure IV:

IV

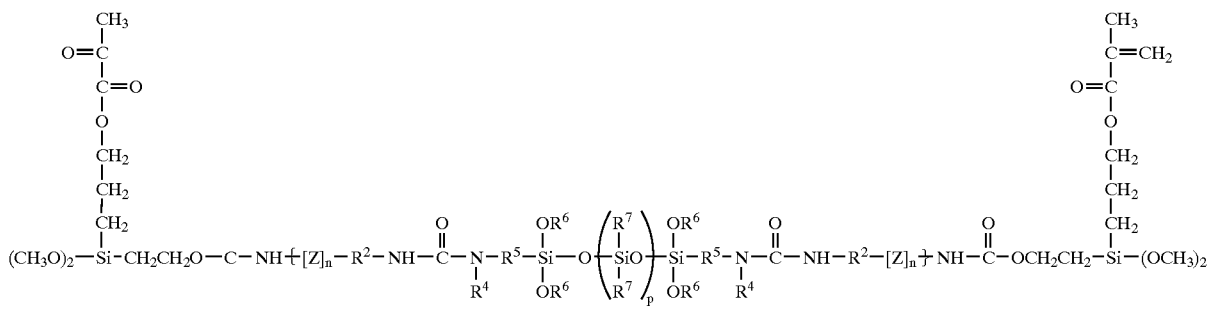

wherein

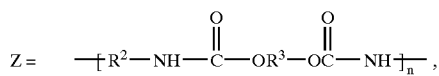

$R^2$ and $R^3$ may be the same or different and are divalent cycloaliphatic or aromatic hydrocarbon radicals or are polyols, polyesters, or polyalkylidenes having weight average molecular weight from about 200 to about 5,000, most desirably 200–500; $R^2$ is a hard segment such as an isophorone diradial; $R^3$ is defined as also a hard segment, such as a propocylated bisphenol A diradial; n is an integer 1–1000, desirably 1 to 10, and more desirably 1–5; p is an integer 1–1,200, desirably 1–200 and most desirably 1–100.

The compositions of the present invention are curable by multiple mechanisms. For example, compositions containing the inventive polymers may be subjected to UV light in the presence of a photo initiator to cure or gel the material, and/or be allowed to cure by moisture under ambient conditions. Either or both of these mechanisms may be used to cure the compositions. In one desirable embodiment, as represented in structure II above, a methacrylated urethane/urea copolymer containing moisture curable silicone soft segments and urethane/urea hard segments is provided.

Polymer Synthesis

The polymers of the present invention are formed via a multiple step or staged process.

Preparation of Isocyanate-terminated Urethane Hard Segments (A-Stage Prepolymer)

An A-stage prepolymer may be prepared from a variety of diisocyanate monomers and diols, thereby producing an isocyanate end-capped prepolymer composition of various molecular weights, with soft and/or hard block segments, as determined by the reactants as shown in Equation V, below, to give the A-staged prepolymer V. Desirably, the final curable polymers of the present invention include both hard and soft segments, although the soft segment is desirably from the silicone portion to be discussed further herein.

EQ. V

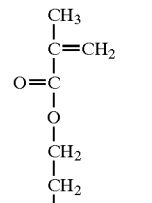
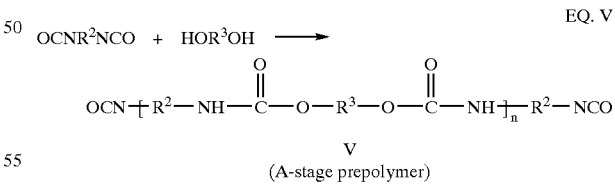

V
(A-stage prepolymer)

wherein $R^2$ and $R^3$ may be the same or different and is a divalent substituted aliphatic, cycloaliphatic or aromatic hydrocarbon radical, or polyol, polyester or polyalkylidene have an average molecular weight from about 200 to 5000, preferably 1000, and n is an integer from 1–100, desirably 1–100.

Examples of diisocyanates useful to produce the A-staged prepolymer V in Equation V above, can include, among others, isophoronediisocyanate (IPDI) tetramethylxylyldiisocyanate, (MXDI) toluene diisocyanate methylene diphenyl diisocyanate (MDDI) 1,6-hexane diisocyanate (HDI) or a substituted or unsubstituted aliphatic, cycloaliphatic or aromatic diisocyanate. Most desirable is isophorone diisocyanate (IPDI). In the A-stage process, other diisocyanates, such as tetramethyl xylylene diisocyanate (TMXDI) and toluene diisocyanate (TDI) and diols such as propolylated hydrogenated bis-phenol-A [HBPA $(PO)_2$], and reactive diluents such as isobomyl methacrylate (IBOMA), hexane diol dimethacrylate (HDDMA), lauryl acrylate, and N,N-dimethyacrylamide (DMA), are useful. In preferred embodiments hydroxyethyl acrylate (HEA), hydroxyl propylacrylate (HPA), and hydroxypropyl(meth)acrylate (HPMA) are also useful. Additional non-limiting, representative examples of useful diisocyanates also include phenyl diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclohexylmethane diisocyanate, 1,3-bis-(isocyanatomethyl) cyclohexane, cyclohexylene diisocyanate, tetrachlorophenylene diisocyanate, 2,6-diethyl-pphenylenediisocyanate, and 3,5-diethyl-4,4'-diisocyanatodiphenyl-methane.

Numerous diols and polyols can be used to form the A-staged prepolymer, such as propoxylated hydrogenated bisphenol-A [HBPA $(PO)_2$], ethoxylated hydrogenated

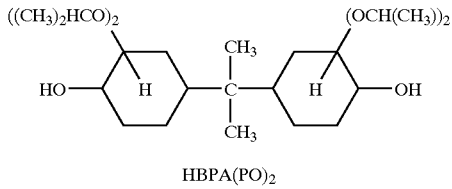

HBPA(PO)$_2$

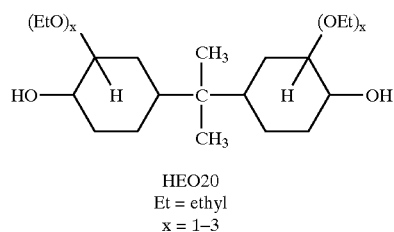

HEO2O
Et = ethyl
x = 1–3 bisphenol A (HEO2O), 4,8-bis(hydroxymethyl)tri-cyclo [5.2.1.0$^{2,6}$]decane (HMTD),

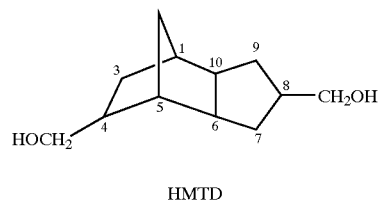

HMTD or divalent substituted $C_1$–$C_{20}$ aliphatic cycloaliphatic or aromatic hydrocarbon radicals, or a polyol, such as polyether diol, polyester diol or polyalkylidiene diol having a weight average molecular weight from about 200 to about 5000. By selecting appropriate diols, polyurethane prepolymer can be produced containing both hard and soft segments, for example where HBPA(PO)$_2$ or HMID are used to produce hard urethane segments and polyether diols are used to produce soft urethane segments. More desirably in the novel urethane A-staged prepolymer in Equation V above, the hard segment is formed from HMTD diol and a silicone soft segment introduced in a later step as described below. Additional non-limiting, representative examples of useful polyols also include 2,2-(4,4'-dihydroxydiphenyl)-butane; 3,3-(4,4'-dihydroxydiphenyl)-pentane; α,α'-(4,4'-dihydroxydiphenyl)-p-diisopropylbenzene; 1,3-cyclohexane diol; 1,4-cyclohexane diol; 1,4-cyclohexanedimethanol; bicyclic and tricyclic diols such as 4,8-bis-(hydroxymethyl)-tricyclo[5.2.1.0$^{2,6}$]decane; 2,2,4,4-tetramethyl-1,3-cyclobutanediols, hydroquinones, resorcinol, and 2,2(4,4'-dihydroxydiphenyl)sulfone, among others, as well as halogenated derivatives of the above, such as tetrabrominated ethoxylated bisphenol-A. These ring compounds may also be substituted with either reactive groups or unreactive groups such as alkyl groups containing about 1 to 4 carbon atoms.

Preparation of the Partially (Meth)acrylate End-capped B-Stage Prepolymer

The next step in the inventive process of preparing the curable polymers of the present invention involves partially capping the A-stage prepolymer with an acrylate to form a B-stage prepolymer VI. For example, A-stage polyurethane prepolymer in Equation VI, was partially capped with a hydroxyalkylacrylate

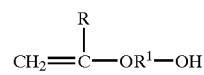

as shown in Equation VI.

EQ VI

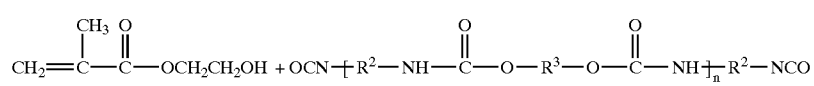

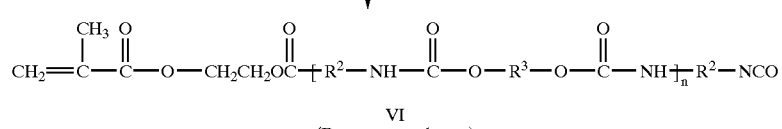

VI
(B-stage prepolymer)

where R is H or methyl, and $R^1$ is a substituted or unsubstituted $C^1$–$C^{20}$ alkylene group, desirably ethylene.

It should be recognized that, notwithstanding the fact that the stoichiometry and the selected reaction conditions chosen yield the B-stage prepolymer as shown, a statistical distribution of reaction product mixture is expected. That is, a minor amount of polymer containing both acrylate ends may be produced, as well as a minor amount of A-stage prepolymer which may remain unreacted.

Preparation of the (Meth)acrylate End-capped Polyurethane/Urea Copolymer (C-Stage)

To begin with, a soft silicone block for use in the C-stage of the present invention is prepared. Nonlimiting examples of useful silicone soft blocks for use as a reactant in the C-stage of the present invention are shown in the reactions in Equation XI below. In this reaction, an amine terminated dialkoxy polydimethylsiloxane (PDMS) is prepared by end-capping a dihydroxy PDMS (silanol) with an amine functional trialkoxysilane. As the skilled artisan would recognize, the molecular of the silanol fluid may vary widely. A particularly useful molecular weight range includes mw about 4,000 to about 12,000, but molecular weights outside these ranges are useful. In the examples below, 4 EAM and 12 EAM are acronyms for bis[(ethylaminopropyl)dimethoxy silyl]polydimethyl siloxane of 4000 and 12000 molecular weights, respectively.

EQ. XI

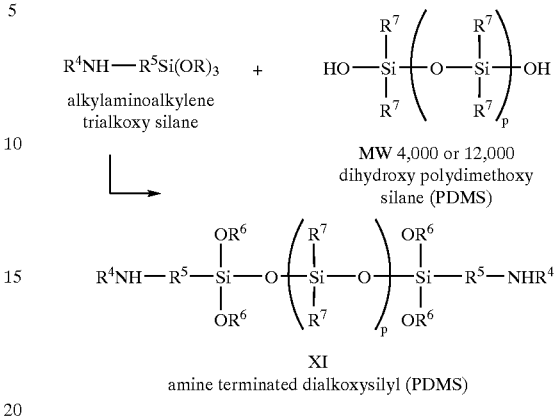

amine terminated dialkoxysilyl (PDMS)

Below is a non-limiting list of other useful variables for the soft silicone segment of the present invention:

| where | $R^4$ | and | $R^6$ | $R^5$ | Amine Terminated Soft Silicone Segment |
|---|---|---|---|---|---|
| | H | | $CH_3$ | —$CH_2CH_2CH^2$— | bis[(aminopropyldimethoxy silyl)] polydimethyl siloxane 4 or 12 DAM |
| | H | | $C_2H_5$ | —$CH_2CH_2CH^2$— | bis[(aminopropyl)diethoxy)silyl] polydimethyl siloxane 4 or 12 DEAM |
| | $C_6H_5$ | | $CH_3$ | —$CH_2CH_2CH^2$— | bis[(phenylaminopropyl)dimethoxysilyl] polydimethyl siloxane 4 or 12 PAM |
| | $CH_3$ | | $CH_3$ | —$CH_2CH_2CH^2$— | bis[(methylaminopropyl dimethoxysilyl)polydimethyl siloxane 4 or 12 MAM |
| | $C_4H_9$ | | $CH_3$ | —$CH_2CH_2CH^2$— | bis[(isobutylaminopropyl)dimethoxysilyl]polydimethyl siloxane 4 or 12 BAM |
| | $C_2H_5$ | | $CH_3$ | —$CH_2CH_2CH^2$—$\underset{CH_3}{\mid}$ | bis[(ethylaminoisobutyl)dimethoxysilyl]polydimethyl Siloxane 4 or 12 EAM |

In particularly desirable embodiments, $R^4$ is ethyl, methyl or butyl, and $R^6$ are methyl and $R^7$.

The soft amine terminated segment silicone is then used in the aforementioned B-stage to produce the novel acrylated polyurethane/urea silicone block copolymer, which is capable of dual curing.

Preparation of Soft Silicone Block for Use in the C-Stage of the Present Invention The last step (C-stage) in the synthesis of the novel (meth)acrylate end-capped polyurethane/urea copolymer containing dialkoxysilyl silicone soft segments is described by Equation VII.

EQ. VII

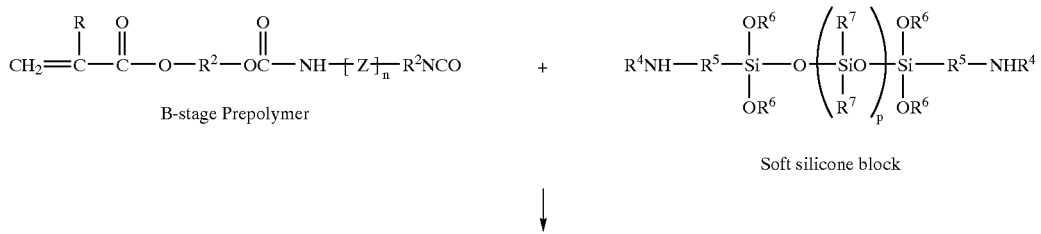

-continued

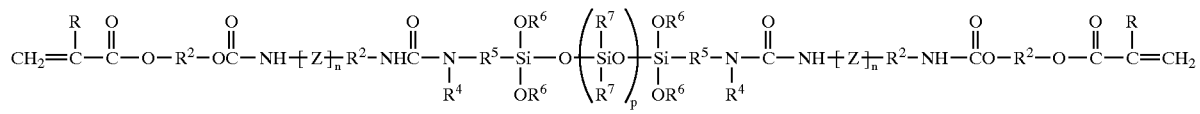

VII
Final Polymer (C-stage)

wherein Z is 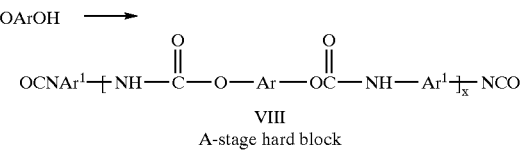.

The B-stage preparation of the partially (meth)acrylated polyurethane hard block prepolymer described in Equation VI above represents a departure from conventional synthesis of acrylated polyurethane material containing hard and soft segment urethane blocks.

For example, conventional acrylated polyurethane process steps have included the formation of urethane hard and soft segments as depicted below in Equations VIII–X.

EQS. VIII-X

Conventional Acrylated Polyurethane Process Step

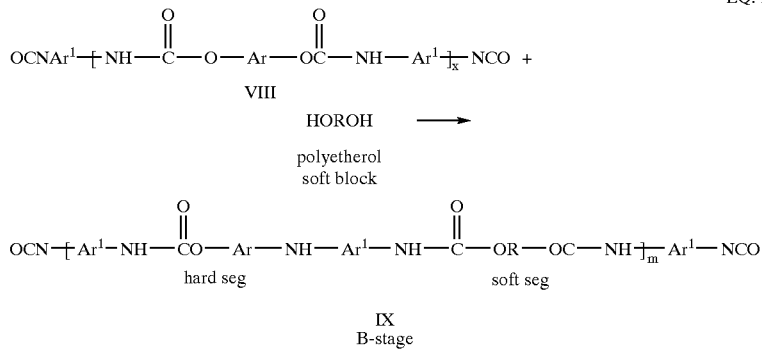

In the above conventional process, Ar and Ar$^1$ are aromatic groups, but it is also known to use aliphatic groups as well.

As shown below in conventional processes, the acrylate capping occurs in the final stage (C-stage), where in the present invention, such capping occurs in the intermediate stage (B-stage).

EQ. X

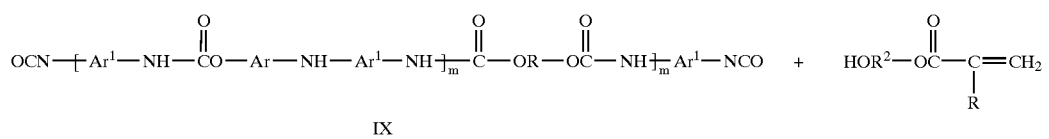

IX

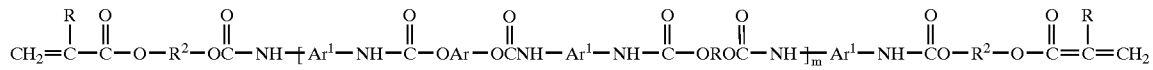

X
Final Polyurethane (C-stage)

Among the advantages of (meth)acrylate end-capping in B-stage as opposed to prior methods which acrylated in the C-stage, are: (1) complete consumption of the volatile acrylate end-capper occurs in the B stage, thereby eliminating undesirable trace amounts of this material in the final product, which can be an environmental concern; (2) a reduction in the concentration of isocyanate groups early on in the process (B-stage), i.e., the isocyanate/amine ratio is reduced, thereby minimizing the ability of secondary reactions to form biuret structures which cause a significant viscosity increase in the final product; (3) the use of secondary amines instead of primary amines reduces the amount of biuret formation. Thus, the inventive compositions are better able to form low viscosity resins which are desirable for final cure by one or more of mechanisms, i.e., photolytic, anaerobic and/or moisture cure.

Additives

A number of photoinitiators may be employed herein to provide the benefits and advantages of the present invention to which reference is made above. Photoinitiators enhance the rapidity of the curing process when the photocurable compositions as a whole are exposed to electromagnetic radiation. Certain metallocenes, such as "IRGACURE" 784DC, may serve a dual purpose as both metallocene and photoinitiator.

Non-limiting examples of U.V. photoinitiators that are useful in the inventive compositions include benzoins, benzophenone, dialkoxy-benzophenones, Michler's ketone (4,4'-bis(dimethylamino)benzophenone) and diethoxyacetophenone.

Examples of suitable photoinitiators for use herein include, but are not limited to, photoinitiators available commercially from Ciba Specialty Chemicals, under the "IRGACURE" and "DAROCUR" trade names, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl)phosphine oxide and 2-hydroxy-2-methyl-1-phenyl-propan-1-one), and 819 [bis(2,4,6-trimethyl benzoyl)phenyl phosphine oxide] and "DAROCUR" 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoimtiators useful herein include alkyl pyruvates, such as methyl, ethyl, propyl, and butyl pyruvates, and aryl pyruvates, such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis ($\eta^5$-2,4-cyclopentadien-1-yl)-bis[2,6difluoro-3-(1H-pyrrol-1-yl)phenyl]titanium (e.g., "IRGACURE" 784DC).

Non-limiting examples of moisture curing catalysts useful in the inventive compositions include a metal compound such as titanium, tin or zirconium. The moisture catalysts are employed in a curingly effective amount, which generally is from about 0.5 to about 5% by weight and desirably about 0.05% to about 2.5% by weight. Tetraisopropoxy titanate or tetrabutoxy titanate are particularly desirable. U.S. Pat. No. 4,111,890 list numerous others that are useful.

A variety of additional useful components may be added to the present inventive compositions. For example, reactive and non-reactive diluents may be added. Such diluents include, without limitation, isofomyl(meth)acrylate, dimethylacrylamide, (meth)acrylic acid and vinyltrimethoxysilane. Other useful additives include plasticizers, fillers, viscosity modifiers, pigments, stabilizers, and the like.

EXAMPLES

Example 1

Preparation of Soft-Segment Silicone Polymer

The procedure for preparation of an aminoalkyl dimethoxysilyl terminated polydimethyl siloxane fluids used as a reactant in the C-stage of the present invention is described in the following example. In a two liter 4 neck round bottom flask equipped with stirrer, thermometer and gas inlet and outlet takes with valves was charged a weighed one liter amount of dihydroxy terminated polydimethyl siloxane (silanol terminated PDMS) of 4000 molecular weight. The fluid was heated to 100° C. with vacuum stripping for one hour to remove the volatile components (moisture and low boiling cyclics). The temperature was deceased to 75° C., and then aminoalkyltrialkoxy silane was added. A 20% excess silane was used for capping. The amount added was calculated as follows:

Amount of silane added=weight of silane fluid×2×molecular weight of silane×1.2 Molecular weight of silane fluid After the silane was added, the mixture was heated at 75° C. under vacuum to removed alcohol (methanol or ethanol) formed from the condensation reaction. This causes vigorous bubbling which subsided in approximately 90 minutes. The reaction was allowed to proceed at 75° C. for three hours under vacuum to yield a clear colorless fluid.

The above experiment was repeated using identical equipment, conditions, reacts and amounts, only a 12,000 molecular weight silanol terminated PDMS was used. The results were substantially identical.

Example 2

This example describes the reaction process of the current invention which produced acrylated polyurethane/urea aminalkyl dialkoxy dimethylsiloxane copolymer compositions.

A-Stage Preparation

Ethoxylated bis-phenol-A (HE020) (0.12 moles, 35 g), isobornyl methacrylate (IBOMA) (58.28 g), methacrylic acid (1.71 g) (MA), 3,6-Di-tert-butyl-4-methylphenol (BHT), (0.19 g), methyldihydroquinone, MeHQ (0.19 g) and isophorone diisocyanate (IPDI) (0.22 mol., 49.22 g) were added sequentially to a 1 liter reaction flask. The mixture was warmed to 50° C. under dry air with vigorous agitation. A catalyst, dibutyltin dilaurete (0.13 g), was then added, and the mixture was stirred at 75° C. for 2 hours. This is the A-stage polyurethane block prepolymer.

B-Stage Preparation

Hydroxyethyl methacrylate (HEMA) 0.089 mole, 11.64 g and a second portion of dibutyltin dilaurate catalyst (0.21 g) were then added to the vigorously stirred mixture, and the reaction was heated at 75° C. for hours. This step is for the preparation of partially (meth)acrylated end-capped B-staged polyurethane resin. Determination of residual isocyanate concentration was made by reacting an aliquot of the B-staged product with excessive dibutylamine, followed by titration with standard hydrochloric acid solution.

C-Stage Preparation

To the B-staged product described above, methylaminopropyl dimethoxy silyl terminated PDMS (251.66 g 0.116 molar), (4000 molecular weight,) was charged to the reactor followed by a second portion of isoborny methacrylate (IBOMA) (74.87 g). The second portion of reactive diluent was added to lower the concentration of isocyanate in the mixture, thereby preventing a runaway reaction between amine and isocyanate due to possible biuret formation. This final process yielded 467.4 g of C-stage copolymer (final product).

Example 3

The acrylated urethane/urea alkylamino alkylene dialkoxy silyl siloxane copolymer formed in Example 2 was added to the catalyst IRGACURE 1700 at a 1.5 wt % level. (IRGACURE 1700 is a 25/75 blend of bis(2,6-dimethyoxybenzoyl)-2,4,4-trimethyl pentyl phosphine oxide/2-hydroxy-2-methyl-1-phenylpropane-1-one.) The material was warmed to 50–90° C. in a vacuum chamber to remove air and volatiles. This was continued until a bubble free resin was produced. The catalyzed resin was found to be particularly useful in adhesive, coating, caulking and potting applications. To evaluate the resin for mechanical properties, the catalyzed resin formulation is placed between two mylar films separated by a 6"×6"×0.75" steel frame spacer. The mylar film-containing samples were further sandwiched by clamping between two one-quarter inch glass plates. The assembly was then exposed to a 70 mw/um$^2$ U.V. light for 30 seconds on each side. The cured resin sample was removed from the assembly and dogbone specimens were cut from the cured slab for bulk property determination.

The wide range of mechanical and tensile lap shear strength that can be generated with various formulations of the copolymer are illustrated in the examples which follow.

Example 4

(Meth)acrylated urethane/urea silicone block resin prepared as described in Example 2, using IPDI and HBPA (PO)$_2$ as the hard urethane block, HEMA as the acrylating end-capper and 12 DAM silicone soft block was used to form tensile lap shear joints between glass and other adherends or between polycarbonate and other adherends. A one half inch overlap containing 20 mil. thick adhesive layer was used according to ASTM D100. Adherends tested for adhesion including glass, steel, aluminum, polycarbonate, nylon and epoxy. Glass or polycarbonate are used as one of the adherends between these joints because they are transparent to U.V. irradiation. The joints were subjected to uv irradiation and moisture cure as set forth in Table I below. The results of tensile, modulus and elongation tests are also set forth in Table I.

TABLE 1

Mechanical Properties of Inventive (Meth)acrylated Urethane/Urea Silicone Block Copolymer

| Composition A<br>12 DAM; 98.5 wt %<br>Irgacure 1700; 1.5 wt % | UV-moisture<br>dual cure | Moisture cure only<br>under ambient<br>conditions |
|---|---|---|
| Tensile (psi): initial | 1455 | — |
| Tensile (psi): 3 days | 1502 | 63 |
| Tensile (psi): 1 week | 1522 | 122 |
| Modulus (psi) @ 50%: initial | 691 | — |
| Modulus (psi) @ 50%: 3 days | 754 | 7 |
| Modulus (psi) @ 50%: 1 week | 783 | 22 |
| Modulus (psi) @ 100%: initial | 874 | — |
| Modulus (psi) @ 100%: 3 days | 928 | 9 |
| Modulus (psi) @ 100%: 1 week | 957 | 39 |
| % Elongation: initial | 210 | — |
| % Elongation: 3 days | 206 | 537 |
| % Elongation: 1 week | 224 | 250 |

The above data clearly shows the moisture curing capability of the resin during ambient exposure. Modulus increases were evident for both dual cure sample and moisture cure only sample. However, in the case of the dual cure sample, it is also clear that the initial UV cure contributed to the bulk of the properties.

Example 5

(Meth)acrylated urethane/urea silicone block copolymer, Composition B, was prepared as described in Example 2, but substituting a lower molecular weight soft segment 4 DEAM for 12 DAM, and cured as described Example 4 above. Mechanical properties and lap shear strengths were measured and the results are set forth in Table 2 below.

Initially UV cure lap shear showed a shear force of 252 psi with adhesive failure to glass. However when lap shear assemblies were tested 3 days after cure, the shear force was >400 psi and actually broke the ¼" glass panels during testing. Thus, it is clear that not only does the composition exhibit good structural adhesive strength, but that the adhesive strength improved on ambient moisture cure.

Example 6

(Meth)acrylated urethane/urea silicone block copolymer, Composition C, was prepared as described in Example 2, but modified by the addition of a reactive additive 20% lauryl acrylate in the B-stage and cured as described above. Mechanical and shear properties were tested and the results are shown in Table 2. Glass to steel tensile lap sheer joints failed at 365 psi, but failure occurred by glass fracture showing that the true shear strength is greater than 365 psi.

Example 7

(Meth)acrylated urethane/urea silicone block copolymer, Composition D, was prepared as described in Example 2, but modified by the addition of a reactive additive, 20% IBOA, and cured as described above. Mechanical properties shown were tested as shown in Table 2. This modification generated mechanical properties which are superior to Compositions B and C.

Example 8

(Meth)acrylated urethane/urea silicone block copolymer, Composition E, was prepared as described in Example 2, but modified by substitution of HEA and lauryl acrylate for HEMA and IBOA. The composition was cured as described above. Mechanical and lap shear properties were tested and the results are shown in Table 2. This modification generated mechanical properties and tensile lap shear strength lower than other compositions tested but shows the range of properties than can be generated with this acrylated urethane/urea silicone block copolymer.

It appears from the tests conducted that the addition of lauryl acrylate had a softening effect when used as a diluent; whereas IBOA caused the cured composition to behave more like a rigid plastic.

TABLE 2

Mechanical Property and Tensile Lap Shear Strength Properties of (Meth)acrylated Urethane/Urea Silicone Block Copolymers

| Composition | B | C | D | E |
|---|---|---|---|---|
| Silicone Block Used; Silicone Content % | 4DEA; 50% | 4DEAM; 50% | 4DEAM; 50% | 4DEAM; 50% |
| End-Capper | HEMA[1] | HEMA | HEMA | HEA[3] |
| Reactive Diluents | IBOMA[2] 27% | Lauryl Acrylate 20%; IBOMA 7% | IBOA 20%; IBOMA 7% | Lauryl Acrylate 27% |
| Appearance | Translucent | Translucent | Translucent | Clear to translucent |
| Tensile (psi): Initial | 1879 | 1613 | 2210 | 442 |
| Tensile (psi): 3 days | 2134 | 1566 | 3810 | 470 |
| Tensile (psi): 1 week | — | 1529 | 3871 | 525 |
| Modulus (psi) @ 50% initial | — | 1040 | — | 276 |
| Modulus (psi) @ 50%: 3 days | 2083 | 1098 | — | 309 |
| Modulus (psi) @ 50%: 1 week | — | 1210 | — | 337 |
| Modulus (psi) @ 100%: initial | — | 1293 | — | — |
| Modulus (psi) @ 100%: 3 days | — | 1333 | — | — |
| Modulus (psi) @ 100%: 1 week | — | 1426 | — | — |
| % Elongation: initial | 59 | 129 | 2 | 87 |
| % Elongation: 3 days | 57 | 121 | 6 | 83 |
| % Elongation: 1 week | — | 116 | 3 | 85 |
| Glass to steel lap shear (psi) | >400 | 365 | >400 | 131 |
| Failure Mode | AF/steel | Broke glass | AF/glass | AF/glass |

Note:
AF-Adhesive Failure
[1]HEMA - hydroxyl ethyl methacrylate
[2]IBOMA - isobornyl methacrylate
[3]HEA - hydroxyethyl acrylate

Example 9

An acrylated urethane/urea silicone block copolymer, Composition F, was prepared as described in Example 2, but replacing 12 DAM (Example 4) with butylamino functional PDMS silicone block 4BAM. This composition was cured as described in Example 2, and its mechanical properties tested. The results are listed in Table 3. The use of 4BAM in place of 12 DAM generated a much stronger and stiffer plastic when compared to Composition A, the 12 DAM version of the silicone block.

TABLE 3

Mechanical Properties of Butyl Amino (BAM) Functional Dimethoxysilyl PDM(S) Copolymers

| Composition | A | F |
|---|---|---|
| Silicone block used; Silicone Content % | 12DAM; 60% | 4BAM; 51% |
| Tensile (psi): initial | 1455 | 2161 |
| Tensile (psi): 3 days | 1502 | 2189 |
| Tensile (psi): 1 week | 1522 | 2191 |
| Modulus (psi) @ 50%: initial | 691 | 1630 |
| Modulus (psi) @ 50%: 3 days | 753 | 1739 |
| Modulus (psi) @ 50%: 1 week | 783 | 1825 |
| Modulus (psi) @ 100%: initial | 874 | 1902 |
| Modulus (psi) @ 100%: 3 days | 928 | 1999 |
| Modulus (psi) @ 100%: 1 week | 957 | 2105 |
| % Elongation: initial | 210 | 120 |
| % Elongation: 3 days | 206 | 117 |
| % Elongation: 1 week | 224 | 111 |

Example 10

A (meth)acrylated urethane/urea silicone block copolymer, Composition G, was prepared or described in Example 9, but replacing 4BAM with 4 MAM, and decreasing the silicone content from 51% to 49% (Table 4). The cured composition resulted in essentially the same properties as Composition F in Example 9.

Example 11

A (meth)acrylated urethane/urea silicone block copolymer, Composition H, was prepared as described in Example 9, but replacing 4 BAM with 4 MAM, and increasing the silicone content from 51% to 53%. The cured composition generated a clear plastic with properties listed in Table 4. As shown in Table 4, slightly higher silicone content substantially increased the percent elongation with little loss in tensile strength.

TABLE 4

Mechanical Properties of Methyl Amino (MAM) Functional Dimethoxysilyl PDMS Copolymers with Various Silicone Contents

| Composition | G | F | H |
|---|---|---|---|
| Silicone block used; Silicone Content % | 4MAM; 49% | 4BAM; 51% | 4MAM; 53% |
| Appearance | Clear | Clear | Clear |
| Tensile (psi): initial | 2239 | 2161 | 1968 |
| Tensile (psi): 3 days | 2307 | 2189 | 2235 |
| Tensile (psi): 1 week | 2343 | 2191 | 2143 |
| Modulus (psi) @ 50%: initial | 1861 | 1630 | 1570 |
| Modulus (psi) @ 50%: 3 days | 1969 | 1739 | 1627 |
| Modulus (psi) @ 50%: 1 week | 2030 | 1825 | 1726 |
| Modulus (psi) @ 100%: initial | 2063 | 1902 | 1675 |
| Modulus (psi) @ 100%: 3 days | 2132 | 1999 | 1724 |
| Modulus (psi) @ 100%: 1 week | 2228 | 2105 | 1827 |
| % Elongation: initial | 120 | 120 | 145 |
| % Elongation: 3 days | 117 | 117 | 138 |
| % Elongation: 1 week | 106 | 111 | 146 |

Example 12

Two (meth)acrylated urethane/urea silicone block copolymers were prepared, Compositions I and J, as described in Example 11 but with 12BAM in one case, and with 12MAM in the other case, instead of 4MAM. Composition I contains the bulky isobutylamino group (12 BAM) in the silicone block, while Composition J contains the less bulky methylamino group in the silicone block. Each of the compositions contained the same silicone content (62%). The test results set forth in Table 5 suggest that there is no significant effect on properties that can be attributed to the bulkier butyl group verses the smaller methyl group.

TABLE 5

Mechanical Properties of (Meth)acrylated Urethane/ Urea Silicone Block Resins Containing Butyl Amino (BAM) Groups And/or Methyl Amino (MAM) Groups in the Silicone Block

| Composition | I | J |
|---|---|---|
| Silicone block used; Silicone content % | 12BAM; 62% | 12MAM; 62% |
| Appearance | Milky | Milky |
| Tensile (psi): initial | 1386 | 1290 |
| Tensile (psi): 3 days | 1344 | 1403 |
| Tensile (psi): 1 week | 1373 | 1383 |
| Modulus (psi) @ 50%: initial | 444 | 466 |
| Modulus (psi) @ 50%: 3 days | 429 | 511 |
| Modulus (psi) @ 50%: 1 week | 453 | 511 |
| Modulus (psi) @ 100%: initial | 574 | 534 |
| Modulus (psi) @ 100%: 3 days | 599 | 585 |
| Modulus (psi) @ 100%: 1 week | 597 | 595 |
| % Elongation: initial | 312 | 372 |
| % Elongation: 3 days | 280 | 381 |
| % Elongation: 1 week | 301 | 350 |

Example 13

A (meth)acrylated urethane/urea silicone block copolymer, Composition K, was prepared as described in Example 11, but 4MAM was replaced with 4BAM and HBPA(PO)$_2$ was replaced with HEO 20. The composition was cured as described above, and mechanical properties were measured and set forth in Table 6.

Example 14

A (meth)acrylated urethane/urea silicone block copolymer, Composition L, was prepared as described in Example 11, but with replacement of 4MAM with 9EAM and replacement of HBPA(PO)$_2$ and IPDI with HEO 20/TMXDE. The compositions were cured as described herein. The cured product generated a clear, pale yellow plastic with increased toughness as set forth in Table 6.

Example 15

A (meth)acrylated urethane/urea silicone block copolymer, Composition M, prepared as described in Example 11, but replacement of 4MAAM with 4EAM and HBPA(PO)$_2$ with HMTD and cured as described in Example 3, generated properties set forth in Table 6.

TABLE 6

Mechanical Properties of (Meth)acrylated Urethane/ Urea Silicone Block Copolymers Showing Effects of Short Block Diols on Properties

| Composition | K | L | M | N |
|---|---|---|---|---|
| Silicone block used; Silicone Content % | 4BAM; 51% | 4EAM; 52% | 4EAM; 52% | 4MAM; 53% |
| Appearance | Clear | Clear/ pale yellow | Clear | Clear |
| Hard Segment | HEO 20/ IPDI | HEO 20/ TMXDI | HMTD/ IPDI | HBPA(PO)$_2$/ IPDI |

TABLE 6-continued

Mechanical Properties of (Meth)acrylated Urethane/ Urea Silicone Block Copolymers Showing Effects of Short Block Diols on Properties

| Composition | K | L | M | N |
|---|---|---|---|---|
| Tensile (psi): initial | 1927 | 1706 | 2085 | 1968 |
| Modulus (psi) @ 50%: initial | 1616 | 1183 | 1532 | 1570 |
| Modulus (psi) @ 100%: initial | 1724 | 1227 | 1631 | 1675 |
| % Elongation: initial | 140 | 200 | 159 | 145 |

Example 16

Two (meth)acrylated urethane/urea silicone block copolymers, were prepared as described in Example 15, but with replacement of the reactive diluent IBOA with N,N-dimethyarylamide (N,N-DMA), and by controlling stoichiometry in the "B" stage such that C-stage addition of 4EAM generated Composition O and P, containing 64% silicone, and 67% silicone respectively, both compositions being cured as described above. Composition Q was prepared similarly using the reactive diluent IBOMA. The mechanical properties of the cured resins are shown in Table 7. The higher silicone content resulted in higher elongation.

TABLE 7

Mechanical Properties of (Meth)acrylated Urethane/ Urea Silicone Block Copolymers Showing Effect of N,N-DMA Reactive Diluent on Properties

| Composition | O | P | Q |
|---|---|---|---|
| Reactive diluent | N,N-DMA; 11% | N,N-DMA; 11% | IBOMA; 28% |
| Silicone block used; Silicone content % | 4EAM; 64% | 4EAM; 67% | 4EAM; 50% |
| Tensile (psi) (initial) | 1773 | 1196 | 2085 |
| Modulus (psi) @ 50% (initial) | 1130 | 748 | 1532 |
| Modulus (psi) @ 100% (initial) | 1450 | 990 | 1631 |
| % Elongation (initial) | 100 | 144 | 159 |

Example 17

A (meth)acrylated polyurethane/urea silicone block copolymer, Composition R, was prepared as described in Example 15, but replacing IBOMA with IBOA and HEMA with HEA. The composition was cured as described above gave mechanical properties as set forth in Table 8.

TABLE 8

Mechanical Properties of (Meth)acrylated Urethane/ Urea Silicone Block Copolymers Showing Effect of Acrylate Diluents on Properties

| Composition | M | R |
|---|---|---|
| Silicone block used; Silicone content % | 4EAM; 52% | 4EAM; 53% |
| Appearance | Clear | Clear |
| Hard Segment | HMTD/IPDI | HMTD/IPDI |
| End-Capper | HEMA 28% IBOMA | HEA 26% IBOA |
| Tensile (psi), initial | 2085 | 1732 |
| Modulus (psi) @ 50%, initial | 1532 | 1313 |
| Modulus (psi) @ 100%, initial | 1631 | 1383 |
| % Elongation, initial | 159 | 160 |

Example 18

A (meth)acrylated polyurethane/urea silicone block resin, Composition S, was prepared as described in Example 17, but with the addition of 10 wt % reactive additive N,N-dimethylacrylamide (N,N-DMA). When cured as described above, its toughness was improved.

TABLE 9

Mechanical Properties of Silicone Copolymers Showing Effect of N,N-DMA as Reactive Additive on Properties

| Composition | S | T |
|---|---|---|
| Silicone block used; Silicone content % | 4EAM; 53% | 4EAM; 48% |
| Appearance | Clear | Clear |
| Hard Segment | HMTD/IPDI | HMTD/IPDI |
| End-Capper | HEA | HEA |
| Reactive Diluent | IBOA | IBOA 10% N,N-Dimethyl-acrylamide |
| Tensile (psi), initial | 1732 | 2291 |
| Modulus (psi) @ 50%, initial | 1313 | 1811 |
| Modulus (psi) @ 100%, initial | 1383 | — |
| % Elongation, initial | 160 | 160 |

What is claimed is:

1. A curable composition comprising the structure:

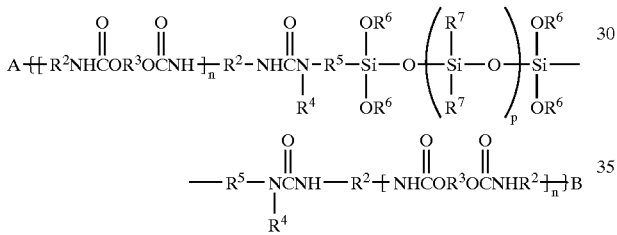

wherein A and B may be the same or different and have the structure:

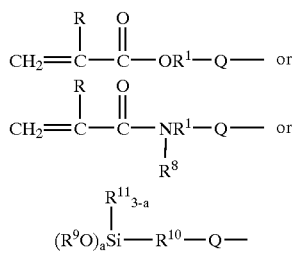

(i) wherein Q is

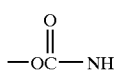

or

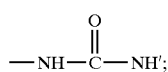

a is 2 to 3; $R^1$ and $R^{10}$ may be the same or different and may be a substituted or unsubstituted $C_1-C_{10}$ alkylene linkage which may be interrupted with a heteroatom; R is H or $CH_3$; and (ii) wherein $R^4$, $R^6$, $R^7$, $R^8$, $R^9$ and $R^{11}$ may be the same or different and are substituted or unsubstituted hydrocarbon radicals; $R^2$ and $R^5$ may be the same or different and are divalent substituted $C_1-C_{40}$ aliphatic, cycloaliphatic or aromatic hydrocarbon radicals, or a polyol, polyester, or polyalkylidene having a weight average molecular weight from about 200 to about 5,000; $R^3$ is a divalent substituted $C_1-C_{40}$ aliphatic, cycloaliphatic or aromatic hydrocarbon radical, or a polyol, polyester, or polyalkylidene having a weight average molecular weight from about 62 to about 5,000; and n is an integer from 1–1000; and p is an integer from 1–1200.

2. The composition of claim 1, wherein R is a methyl group.

3. The composition of claim 1, wherein $R^2$ is selected from the group:

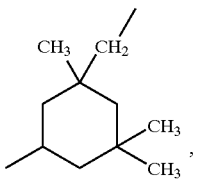 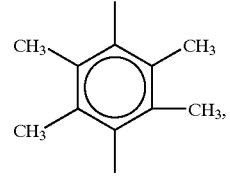

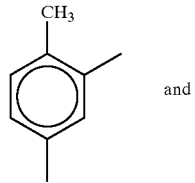 and 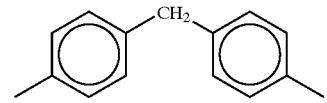

4. The composition of claim 1, wherein $R^3$ is a short chain diol having an average molecular weight of about 62 to about 1,000.

5. The composition of claim 4, wherein the short chain diol is selected from the group consisting of propoxylated hydrogenated-bis-phenol-A, ethoxylated hydrogenated-bisphenol-A and 4,8-bis(hydroxymethyl)tricyol-[5.2.1.0$^{2,6}$] decane.

6. The composition of claim 1, wherein $R^3$ is a substituted or unsubstituted $C_{1-20}$ alkylene group.

7. The composition of claim 1, wherein $R^3$ is an ethylene group.

8. The composition of claim 1, wherein $R^4$ is a monovalent substituted or unsubstituted $C_{1-10}$ alkyl radical.

9. The composition of claim 1, wherein $R^4$ is selected from the group consisting of a methyl, ethyl and isobutyl group.

10. The composition of claim 1, wherein $R^5$ is a substituted or unsubstituted $C_{1-40}$ alkylene group.

11. The composition of claim 1, wherein $R^5$ is propylidene.

12. The composition of claim 1, wherein $R^6$ is a substituted or unsubstituted $C_{1-10}$ alkyl or aryl.

13. The composition of claim 1, wherein $R^6$ is selected from the group consisting of a methyl, ethyl and propyl group.

14. The composition of claim 1, wherein $R^7$ is a monovalent substituted or unsubstituted $C_{1-10}$ alkyl or aryl radical.

15. The composition of claim 1, wherein $R^7$ is a methyl group.

16. A curable composition comprising the reaction product of:

(a) a reactive urethane prepolymer component having a radiation-curable group proximal to one terminus of the prepolymer and an isocyanate group proximal to the other terminus of the prepolymer; and (b) an amninoalkylenedialkoxysilyl-terminated polydiorganosiloxane.

17. The composition of claim 16, wherein component (a) has the structure:

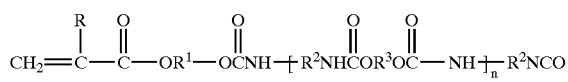

wherein R may be H or methyl; $R^1$ is a divalent substituted or unsubstituted $C_1$–$C_{40}$ aliphatic, cycloaliphatic or aromatic hydrocarbon radical; $R^2=R^1$ and may be the same or different; $R^3$ may be a polyol, polyether, polyalkylidiene, or polyester having a weight average molecular weight from about 200 to about 5,000; and n is an integer from 1–10.

18. The composition of claim 16, wherein component (b) has the structure:

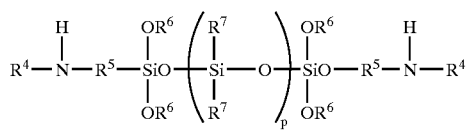

wherein $R^4$ is a monovalent substituted or unsubstituted $C_1$–$C_{40}$ aliphatic, cycloaliphatic or aromatic hydrocarbon radical; $R^5$ is a substituted or unsubstituted divalent $C_1$–$C_{40}$ aliphatic, cycloaliphatic or aromatic hydrocarbon radical; $R^6=R^4$ and may be the same or different; $R^7=R^6$ and may be the same or different; and p is an integer from 1–1,200.

19. The composition polymer of claim 16, wherein said radiation-curable group is a methacrylate group.

20. The composition of claim 16, wherein said reactive prepolymer component is an isocyanate prepolymer having a terminal methacrylate group.

21. A uv/moisture dual curing composition comprising:
a.) a (meth)acrylated urethane/urea silicone copolymer comprising the structure:

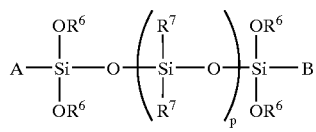

wherein A and B may be the same or different and have the structure:

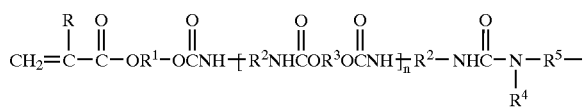

wherein R is H or $CH_3$; $R^1$ is a divalent substituted or unsubstituted $C_1$–$C_{40}$ aliphatic, cycloaliphatic or aromatic hydrocarbon radical; $R^2=R^1$ and may be the same or different; $R^3$ is a polyol, polyether, polyalkylidiene, or polyester having a weight average molecular weight from about 200 to about 5,000; n is an integer from 1–10; p is an integer from 1–1,200; $R^4$ is a monovalent substituted or unsubstituted $C_1$–$C_{40}$ aliphatic, cycloaliphatic or aromatic hydrocarbon radical; $R^5$ is a substituted or unsubstituted divalent $C_1$–$C_{40}$ aliphatic, cycloaliphatic or aromatic hydrocarbon radical; $R^6=R^4$ and may be the same or different; and $R^7=R^6$ and may be the same or different; and b.) a cure system for said copolymer.

22. The composition of claim 21, wherein said cure system comprises a moisture cure catalyst.

23. The composition of claim 22, wherein said moisture cure catalyst is a titanium alkoxides.

24. The composition of claim 21, wherein said cure system comprises a radiation curing initiator.

25. The curable polymer of claim 24, wherein said radiation curing initiator is a photoinitiator selected from the group consisting of benzoins, benzophenones, dialkoxy benzophenones, Mieher's Michler's ketone, diethoxy acetophenone and the ultraviolet/visible photoinitiator combination of bis(2,6-dimethoxybenzoyl-2,4,4-trimethylpentyl)phosphine oxide and 2-hydroxy-2-methyl-1-phenyl-propan-1-one.

26. A method of preparing a curable silicone polymer comprising the step of:

reacting an isocyanate-terminated urethane prepolymer having a terminal (meth)acrylate group with an alkylaminoalkylenedialkoxysilyl-terminated polydiorganosiloxane.

27. The method of claim 26 further comprising the steps of forming said isocyanate-terminated urethane prepolymer having a terminal (methlacrylate group by reacting an isocyanate-terminated urethane prepolymer with a hydroxy alkyl (methlacrylate monomer.

28. The method of claim 27 wherein said isocyanate prepolymer having a terminal (meth)acrylate group comprises the structure:

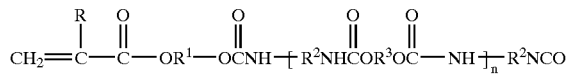

wherein R is H or methyl; $R^1$ is a divalent substituted or unsubstituted $C_1$–$C_{40}$ aliphatic, cycloaliphatic or aromatic hydrocarbon radical; $R^2=R^1$ and may be the same or different; $R^3$ is a polyol, polyether, polyalkylidiene, or polyester having a weight average molecular weight from about 200 to about 5,000; and n is an integer from 1–10.

29. The method of claim 26, wherein said aminoalkylenedialkoxysilyl-terminated polydiorganosiloxane comprises the structure:

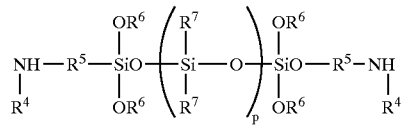

$R^4$ is a monovalent substituted or unsubstituted aliphatic, cycloaliphatic or aromatic hydrocarbon radical $C_1$–$C_{40}$; $R^5$ is a substituted or unsubstituted divalent $C_1$–$C_{40}$ aliphatic, cycloaliphatic or aromatic hydrocarbon radical; $R^6=R^4$ and may be the same or different; $R^7=R^6$ and may be the same or different; and p is an integer from 1–1,200.

30. The method of claim 26, wherein said alkylaminoalkylenedialkoxysilyl-terminated polydiorganosiloxane is prepared by the steps comprising reacting an alkylaminoalkylenetrialkoxy-terminated silane with a silanol terminated polydimethylsiloxane.

\* \* \* \* \*

UNITED STATES PATENT AND TRADEMARK OFFICE
CERTIFICATE OF CORRECTION

PATENT NO. : 6,750,309 B1
DATED : June 15, 2004
INVENTOR(S) : Hsien-Kun Chu et al.

It is certified that error appears in the above-identified patent and that said Letters Patent is hereby corrected as shown below:

Column 7,
Line 21, replace the chemical structure with the following:

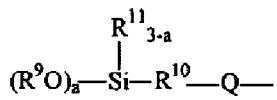

Column 9,
Line 6, change "propolylated" to -- propoxylated --.
Line 7, change "isobomyl" to -- isobornyl --.
Line 20, change "2,6-diethyl-pphenylenediisocyanate" to
-- 2,6-diethyl-p-phenylenediisocyanate --.
Line 27, delete the closed square bracket after "(PO)$_2$"

Column 16,
Line 13, change "bis($\eta^5$-2,4-cyclopentadien-1-yl)-bis[2,6difluoro-3-(1H-pyrrol-1-yl)phenyl]titanium" to -- bis($\eta^5$-2,4-cyclopentadien-1-yl)-bis[2,6-difluoro-3-(1H-pyrrol-1-yl)phenyl]titanium --.
Line 47, change "deceased" to -- decreased --.

Column 17,
Lines 3 and 26, change "isobomyl" to -- isobornyl --.
Line 50, delete "a"
Line 50, change "mw/um$^2$" to -- mW/cm$^2$ --.

UNITED STATES PATENT AND TRADEMARK OFFICE
CERTIFICATE OF CORRECTION

PATENT NO.    : 6,750,309 B1
DATED         : June 15, 2004
INVENTOR(S)   : Hsien-Kun Chu et al.

It is certified that error appears in the above-identified patent and that said Letters Patent is hereby corrected as shown below:

Column 23,
Line 63, replace the chemical structure with the following:

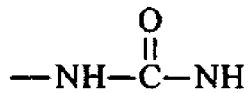

Signed and Sealed this

Twenty-third Day of November, 2004

JON W. DUDAS
*Director of the United States Patent and Trademark Office*